(12) United States Patent
Winkler et al.

(10) Patent No.: US 9,102,873 B2
(45) Date of Patent: Aug. 11, 2015

(54) SM-ACTIVATED ALUMINATE AND BORATE PHOSPHORS

(75) Inventors: Holger Winkler, Darmstadt (DE); Thomas Juestel, Witten (DE); Simas Sakirzanovas, Steinfurt (DE)

(73) Assignee: Merck Patent GmbH, Darmstadt (DE)

(*) Notice: Subject to any disclaimer, the term of this patent is extended or adjusted under 35 U.S.C. 154(b) by 471 days.

(21) Appl. No.: 13/502,895

(22) PCT Filed: Sep. 15, 2010

(86) PCT No.: PCT/EP2010/005669
§ 371 (c)(1),
(2), (4) Date: Apr. 19, 2012

(87) PCT Pub. No.: WO2011/047757
PCT Pub. Date: Apr. 28, 2011

(65) Prior Publication Data
US 2012/0224353 A1 Sep. 6, 2012

(30) Foreign Application Priority Data
Oct. 23, 2009 (DE) .......................... 10 2009 050 542

(51) Int. Cl.
C09K 11/08 (2006.01)
C09K 11/77 (2006.01)
H01J 1/62 (2006.01)
H05B 33/14 (2006.01)

(52) U.S. Cl.
CPC ......... *C09K 11/7768* (2013.01); *C09K 11/7774* (2013.01); *H05B 33/14* (2013.01)

(58) Field of Classification Search
CPC ............... C09K 11/77; C09K 11/7774; C09K 11/7703; C09K 11/7768; C09K 11/7764
USPC ....... 252/301.4 R, 301.4 F, 301.6 R; 313/486, 313/487, 502, 503; 362/84
See application file for complete search history.

(56) References Cited

U.S. PATENT DOCUMENTS

| | | | |
|---|---|---|---|
| 4,606,846 A | 8/1986 | Kahn et al. | |
| 5,043,308 A | 8/1991 | Luetkens, Jr. et al. | |
| 6,740,262 B2 | 5/2004 | Oshio | |
| 7,247,257 B2 | 7/2007 | Murazaki et al. | |
| 2002/0032118 A1* | 3/2002 | Oshio | 501/120 |
| 2005/0161639 A1* | 7/2005 | Fukuta et al. | 252/301.4 R |
| 2006/0163999 A1 | 7/2006 | Murazaki et al. | |
| 2009/0160341 A1 | 6/2009 | Justel et al. | |
| 2010/0084962 A1* | 4/2010 | Winkler et al. | 313/484 |
| 2010/0194263 A1 | 8/2010 | Winkler et al. | |

FOREIGN PATENT DOCUMENTS

| | | | |
|---|---|---|---|
| CN | 1669981 A | 9/2005 | |
| EP | 0 916 748 A1 | 5/1999 | |
| EP | 1 394 864 A1 | 3/2004 | |
| JP | 5792522 A | 6/1982 | |
| JP | 2007138042 | 6/2007 | |
| TW | 200907025 A | 2/2009 | |
| WO | 2007/116331 A1 | 10/2007 | |

OTHER PUBLICATIONS

Viana et al. Absorption and Fluorescence Investigation of Pr3+, Sm3+, Ho3+ and Er3+ in LaMgAl11O19 Single Crystals SPIE, vol. 1182, French-Israeli Workshop on Solid State Lasers [1988], pp. 225-229.*
Kahn et al. Preparation, structure, optical, and magnetic properties of lanthanide aluminate single crystals LnMAl11O19), Nov. 1981, J. Appl. Phys. vol. 52, pp. 6864-6869.*
Scheel et al., Crystal Growth Technology: From Fundamentals and Simulation to Large-Scale Production, Chapter 16, "Flame-Fusion (Verneuil) Growth of Oxides", published online Nov. 25, 2008, pp. 415-434.*
Sakirzanovas et al., "Synthesis and photoluminescence properties of Sm3+ doped LaMgB5O10 and GdMgB5O10", Feb. 2011, Journal of Luminescence, vol. 131, pp. 1525-1529.*
Viana et al. Absorption and Fluorescence Investigation of Pr3+, Sm3+, Ho3+ and Er3+ in LaMgAl11O19 Single Crystals SPIE, vol. 1182, French-Israeli Workshop on Solid State Lasers [1988], pp. 225-229.*
Mikhail, P., et al., "SrB4O7:Sm2+: chrystal chemistry, Czochralski growth and optical hole burning," Journal of Chemistry Materials, 2000,10, pp. 987-991.
Zeng, Q, et al., "Luminescent Properties of Divalent Samarium-Doped Strontium Hexaborate," Chem. Mater., 1999, 11, pp. 605-611.
Stefani, R., et al., "Photoluminescent behavior of SrB4O7:RE2+ (RE=Sm and Eu prepared by Pechini, combustion and ceramic methods," Journal of Solid State Chemistry 179, 2006, pp. 1086-1092.
Sakirzanovas, S., "Luminescence Properties of Divalen Samarium-Doped Strontium Tetraborate," Abstract 7th International Conference of f Elements, ICfE 7, Aug. 23-27, 2009, one page, Cologne, Germany.
International Search Report issued in corresponding PCT/EP2010/005669 on Feb. 4, 2011.
Official Action related to corresponding Chinese Patent Application No. 201080047788.1 dated Dec. 18, 2013.
B. Viana et al. "Adsorption and Fluorescence Investigation of Pr3+, Sm3+, Ho3+ and Er3+ in LaMgAl11O19 Single Crystals" SPIE, vol. 1182, French-Israeli Workshop on Solid State Lasers [1988], pp. 225-229.
Search Report related to corresponding Taiwanese Patent Application No. 099136185 dated Sep. 23, 2014.
H. Chen et al. "Testing LaMgAl11O19 crystal for X-ray spectroscopy" UCRL-CONF-203300, Lawrence Livermore National Laboratory, Submitted to 15th HTPD Conference, [Mar. 31, 2004], 16 pages.
English Abstract of related Japanese Patent Application No. 2007138042 dated Jun. 7, 2007.

* cited by examiner

*Primary Examiner* — Carol M Koslow
*Assistant Examiner* — Lynne Edmondson
(74) *Attorney, Agent, or Firm* — Millen, White, Zelano & Branigan P.C.

(57) ABSTRACT

Disclosed are phosphors of formula (I) $(Ln_{1-a-b}Gd_a Sm_b)_w Mg_x Sr_y (Al_{1-c}B_c)_z O_{(3/2w+x+y+3/2z)}$ (I), where Ln=Y, La and/or Lu; a, c=0.0 to 1.0; 0<b<0.2 and a+b<1.0; w=1.0 to 3.0; x, y=1.0 to 2.0 and z>0.0 to 12.0, and to a process for the preparation of these phosphors and to the use thereof as conversion phosphors for conversion of the near-UV emission from an LED.

20 Claims, 10 Drawing Sheets

SM-ACTIVATED ALUMINATE AND BORATE PHOSPHORS

The invention relates to phosphors which consist of Sm-activated aluminates and borates, to the preparation thereof, and to the use thereof as LED conversion phosphors for near-UV LEDs.

Phosphor-converted LEDs for general and special lighting (displays, signals, flash lights) have been under development for more than ten years, with by far the majority of all manufacturers relying on the use of blue-emitting InGaN LEDs. The reason for this is that the Stokes loss due to the conversion of blue semiconductor radiation into a white spectrum is minimised on use of blue LEDs (420-480 nm) and the maximum lumen efficiencies can thus be achieved. The theoretical limit for a white light source with colour reproduction above 80 is at about 350 lm/W, with Nichia recently having developed a white LED with just under 250 lm/W. This LED is based on a YAG:Ce-converted InGaN semiconductor which emits in the blue spectral region.

A disadvantage of dichromatic white LEDs which use a yellow-emitting phosphor as converter is their cold light colour ($T_c$=5000-8000 K). The provision of warm-white LEDs is achieved through the addition of a second phosphor which emits in the red spectral region (590-650 nm). The phosphors used to date, namely CaS:Eu, CaAlSiN$_3$:Eu and Ca$_2$Si$_5$N$_8$:Eu, are all based on the activator Eu$^{2+}$, which is distinguished both by a broad absorption spectrum and also by a broad emission band.

The use of red-emitting line emitters as converters in warm-white LEDs is of considerable interest since this would enable the lumen equivalent and thus the lumen yield to be increased by about 20-30%. However, the suitable activator ions, such as, for example, Eu$^{3+}$ and Pr$^{3+}$, only have weak absorption bands in the blue spectral region. The conclusion was thus that efficient red-emitting line emitters based on these ions can be provided, but that they are only suitable as converters for LEDs which emit in the near UV.

EP 916748 discloses a lanthanum magnesium aluminate compound of the composition LaMgAl$_{11}$O$_{19}$ (LMA), but this is not activated by Sm and is thus unsuitable for use in near-UV LEDs.

*Ceramics Intern.* 2006, 32(6), 665-671, Tang et al. "*The photoluminescence of SrAl$_2$O$_4$:Sm phosphors*" discloses the phosphor SrAl$_2$O$_4$:Sm.

JP-2000144129 describes a co-doped SrAl$_4$O$_7$:Eu, Sm.

EP 1121000 and EP 1111966 describe Sm-doped borates of the composition SrB$_4$O$_7$:Sm.

Singh et al. *Physica Status Solidi A:Appl. And Mater. Sci,* 2006, 203(8), 2058-2064 "*Eu and Sm emission in SrAl$_{12}$O$_{19}$ phosphors prepared via combustion synthesis*" discloses an Sm-activated phosphor.

The object of the present invention is therefore to prepare novel Sm-activated phosphors which satisfy the above-mentioned requirements with respect to high light efficiency and use, in particular, in near-UV LEDs.

Surprisingly, it has been found that Sm-activated aluminates of the compositions LaMgAl$_{11}$O$_{19}$:Sm, GdSr$_2$AlO$_5$:Sm and LaSr$_2$AlO$_5$:Sm and Sm-activated borates of the composition LnMgB$_5$O$_{10}$:Sm, where Ln=Y, La, Gd or Lu, satisfy these requirements.

The present invention thus relates to phosphors of the formula I $$(Ln_{1-a-b}Gd_aSm_b)_wMg_xSr_y(Al_{1-c}B_c)_zO_{(3/2w+x+y+3/2z)} \quad (I)$$

where
Ln=Y, La and/or Lu
a, c=0.0 to 1.0
0<b<0.2 and a+b≤1.0
w=1.0 to 3.0
x, y=1.0 to 2.0 and
z>0.0 to 12.0.

Preference is given here to the following phosphors:

$$LaMgAl_{11}O_{19}:Sm \quad (II)$$

$$LaSr_2AlO_5:Sm \quad (III)$$

$$GdSr_2AlO_5:Sm \quad (IV)$$

$$LaMgB_5O_{10}:Sm \quad (V)$$

$$GdMgB_5O_{10}:Sm \quad (VI)$$

The term scheme of Sm$^{3+}$ (G. Blasse, B. C. Grabmeier, Luminescent Materials, Springer-Verlag 1994) shows that the dominant transitions ($^4G_{5/2}$-$^6H_J$) are between 14000 and 18000 cm$^{-1}$, which means that a multiplet of red-orange emission lines can be expected. However, Sm$^{3+}$ can only be excited in the near UV since no suitable transitions are present in the blue spectral region, meaning that Sm$^{3+}$-activated phosphors are only suitable for near-UV LEDs.

Sm$^{2+}$ is isoelectronic with Eu$^{3+}$, meaning that the term scheme is virtually identical with that of Eu$^{3+}$, i.e. only the splitting of the energy levels is reduced owing to the lower ion charge and the consequently lower Stark splitting. Thus, Sm$^{2+}$-doped phosphors exhibit emission lines between 10000 and 15000 cm$^{-1}$ caused by $^5D_0$-$^7F_J$ transitions and are thus suitable as NIR emitters. In addition, the low position of the strongly absorbent 4f5d band allows excitation in the visible spectral region, i.e. also by blue-emitting LEDs.

The atom concentrations of the Sm doping are between 0.1 and 10%, based on the crystallographic site at which Sm$^{2+}$ or Sm$^{3+}$ is incorporated.

The particle size of the phosphors according to the invention is between 50 nm and 30 µm, preferably between 1 µm and 20 µm, more preferably between 2 µm and 12 µm.

The present invention furthermore relates to a process for the preparation of a compound of the 6-3-6-4 alkaline-earth metal silicooxynitride type with europium doping, having the following process steps:
a) preparation of an Sm-doped compound by mixing at least 4 starting materials selected from lanthanum-, magnesium-, aluminium-, samarium-, gadolinium-, boron-, yttrium-, lutetium-containing materials,
b) optionally addition of at least one further organic and/or inorganic substance,
c) thermal aftertreatment of the phosphor.

The starting materials for the preparation of the compound or phosphor consist of the corresponding oxides, carbonates or nitrates. Suitable starting materials are also further inorganic and/or organic substances, such as cyanamides, dicyanamides, cyanides, oxalates, malonates, fumarates, citrates, ascorbates and acetylacetonates.

In the case of preparation by the solid-state diffusion method, organic solvents, such as acetone (see process step b), can also be added, for example. They serve as assistants for better miscibility of the starting materials. If wet-chemical methods (see described below in greater detail) are used, organic (for example precipitants, such as urea) or inorganic substances (for example acids), depending on the method used, are used.

The thermal aftertreatment mentioned above (see process step c) takes a number of hours. It can also be carried out under reducing conditions, for example with forming gas (for example 90/10), pure hydrogen and/or in an ammonia atmosphere, with or without the atmospheres mentioned above.

The temperatures during the calcination process are between 950° C. and 1800° C., preferably from 1000° C. to 1550° C., for several hours (preferably 8 h).

Besides the preparation of the phosphors by solid-state diffusion methods, wet-chemical preparation methods are also suitable. The combustion method using urea (see Example 1) is preferred. In this method, for example, nitrate solutions of the corresponding phosphor starting materials are dissolved in water, then boiled under reflux, and urea is added, causing the slow formation of the phosphor precursor.

In addition, the following further wet-chemical methods are also conceivable:
- coprecipitation with an $NH_4HCO_3$ solution (see, for example, *Jander, Blasius Lehrbuch der analyt. u. präp. anorg. Chem. [Textbook of Analyt. and Prep. Inorg. Chem.]* 2002)
- Pecchini method using a solution of citric acid and ethylene glycol (see, for example, *Annual Review of Materials Research* Vol. 2006, 281-331)
- Spray drying of aqueous or organic salt solutions (starting materials)
- spray pyrolysis of aqueous or organic salt solutions (starting materials)
- evaporation of nitrate solutions and thermal conversion of the residue With the aid of the above-mentioned processes, it is possible to produce any desired outer shapes of the compounds or phosphors according to the invention, such as spherical particles, flakes and structured materials and ceramics. These shapes are summarised in accordance with the invention under the term "shaped bodies". The shaped body is preferably a "phosphor body".

The present invention thus furthermore relates to a shaped body comprising the compounds according to the invention, which has a rough surface which carries nanoparticles comprising $SiO_2$, $TiO_2$, $Al_2O_3$, ZnO, $ZrO_2$ and/or $Y_2O_3$ or mixed oxides thereof and/or particles comprising the compound according to the invention with or without samarium as activator.

In a further preferred embodiment, the shaped body has a structured (for example pyramidal) surface on the side opposite an LED chip (see WO 2008/058619, Merck, which is incorporated in its full scope into the context of the present application by way of reference). This enables as much light as possible to be coupled out of the phosphor.

The structured surface on the shaped body is produced by subsequent coating with a suitable material which is already structured, or in a subsequent step by (photo)lithographic processes, etching processes or by writing processes using energy or material beams or the action of mechanical forces.

In a further preferred embodiment, the shaped bodies according to the invention have, on the side opposite an LED chip, a rough surface which carries nanoparticles comprising $SiO_2$, $TiO_2$, $Al_2O_3$, $ZnO_2$, $ZrO_2$ and/or $Y_2O_3$ or combinations of these materials and/or comprising particles having the phosphor composition of the formula I with or without the dopant samarium. A rough surface here has a roughness of up to a few 100 nm. The coated surface has the advantage that total reflection can be reduced or prevented and the light can be better coupled out of the phosphor according to the invention (see WO 2008/058619 (Merck), which is incorporated in its full scope into the context of the present application by way of reference).

It is furthermore preferred for the shaped bodies according to the invention to have, on the surface facing away from the chip, a layer of matched refractive index which simplifies the coupling-out of the primary radiation and/or the radiation emitted by the phosphor body.

In a further preferred embodiment, the shaped bodies have a continuous surface coating consisting of $SiO_2$, $TiO_2$, $Al_2O_3$, ZnO, $ZrO_2$ and/or $Y_2O_3$ or mixed oxides thereof and/or of the compounds of the formula I without the activator samarium. This surface coating has the advantage that a suitable graduation of the refractive indices of the coating materials enables the refractive index to be matched to the environment. In this case, the scattering of the light at the surface of the phosphor is reduced and a greater proportion of the light is able to penetrate into the phosphor and be absorbed and converted there. In addition, the surface coating of matched refractive index enables more light to be coupled out of the phosphor since total internal reflection is reduced.

In addition, a continuous layer is advantageous if the phosphor has to be encapsulated. This may be necessary in order to counter sensitivity of the phosphor or parts thereof to diffusing water or other materials in the immediate environment. A further reason for encapsulation with a closed shell is thermal decoupling of the actual phosphor from the heat generated in the chip. This heat results in a reduction in the fluorescence light yield of the phosphor and may also influence the colour of the fluorescence light. Finally, a coating of this type enables the efficiency of the phosphor to be increased by preventing lattice vibrations arising in the phosphor from propagating to the environment.

In addition, it is preferred for the shaped body to have a porous surface coating consisting of $SiO_2$, $TiO_2$, $Al_2O_3$, ZnO, $ZrO_2$ and/or $Y_2O_3$ or mixed oxides thereof and/or of the compounds of the formula I with or without the dopant samarium. These porous coatings offer the possibility of further reducing the refractive index of a single layer. Porous coatings of this type can be produced by three conventional methods, as described in WO 03/027015, which is incorporated in its full scope into the context of the present application by way of reference: the etching of glass (for example soda-lime glasses (see U.S. Pat. No. 4,019,884)), the application of a porous layer, and the combination of a porous layer and an etching operation.

In a further preferred embodiment, the shaped body has a surface which carries functional groups which facilitate chemical bonding or physical binding to the environment, preferably consisting of epoxy or silicone resin. These functional groups can be, for example, esters or other derivatives which are bonded via oxo groups and are able to form links to constituents of the binders based on epoxides and/or silicones. Surfaces of this type have the advantage that homogeneous incorporation of the phosphors into the binder is facilitated. Furthermore, the rheological properties of the phosphor/binder system and also the pot lives can thereby be adjusted to a certain extent. Processing of the mixtures is thus simplified. The term physical binding to the environment is used in this connection if electrostatic interactions act between the systems via charge fluctuations or partial charges.

Since the phosphor layer according to the invention applied to the LED chip preferably consists of a mixture of silicone and homogeneous phosphor particles, and the silicone has a surface tension, this phosphor layer is not uniform on a microscopic level or the thickness of the layer is not constant throughout.

The preparation of flake-form phosphors as a further preferred embodiment is carried out by conventional processes from the corresponding metal salts and/or rare-earth salts. The preparation process is described in detail in EP 763573 and WO 2008/058620, which are incorporated into the context of the present application in their full scope by way of reference. These flake-form phosphors can be prepared by coating a natural or synthetically prepared, highly stable support or a substrate comprising, for example, mica, $SiO_2$, $Al_2O_3$, $ZrO_2$, glass or $TiO_2$ flakes which has a very large aspect ratio, an atomically smooth surface and an adjustable thickness with a phosphor layer by a precipitation reaction in aqueous dispersion or suspension. Besides mica, $ZrO_2$, $SiO_2$, $Al_2O_3$, glass or $TiO_2$ or mixtures thereof, the flakes may also consist of the phosphor material itself or be built up from one material. If the flake itself merely serves as support for the phosphor coating, the latter must consist of a material which is transparent to the primary radiation of the LED, or absorbs the primary radiation and transfers this energy to the phosphor layer. The flake-form phosphors are dispersed in a resin (for example silicone or epoxy resin), and this dispersion is applied to the LED chip.

The flake-form phosphors can be prepared on a large industrial scale in thicknesses of 50 nm to about 20 μm, preferably between 150 nm and 5 μm. The diameter here is from 50 nm to 20 μm. The aspect ratio (ratio of the diameter to the particle thickness) is generally 1:1 to 400:1 and in particular 3:1 to 100:1. The flake dimensions (length×width) are dependent on the arrangement. Flakes are also suitable as centres of scattering within the conversion layer, in particular if they have particularly small dimensions.

The surface of the flake-form phosphor according to the invention facing the LED chip can be provided with a coating which has an antireflection action with respect to the primary radiation emitted by the LED chip. This results in a reduction in back-scattering of the primary radiation, enabling the latter to be coupled better into the phosphor body according to the invention.

Suitable for this purpose are, for example, coatings of matched refractive index, which must have the following thickness d: d=[wavelength of the primary radiation of the LED chip/(4*refractive index of the phosphor ceramic)], see, for example, Gerthsen, Physik [Physics], Springer Verlag, 18th Edition, 1995. These coatings may also consist of photonic crystals, which also includes structuring of the surface of the flake-form phosphor in order to achieve certain functionalities.

The shaped bodies according to the invention in the form of ceramic bodies are produced analogously to the process described in WO 2008/017353 (Merck), which is incorporated in its full scope into the context of the present application by way of reference. In this process, the phosphor is prepared by mixing the corresponding starting materials and dopants, subsequently subjected to isostatic pressing and applied directly to the surface of the chip in the form of a homogeneous, thin and non-porous flake or at a distance from the chip (remote phosphor concept). The respective arrangement depends, inter alia, on the architecture of the LED device, where the person skilled in the art is able to select the advantageous arrangement. There is thus no location-dependent variation of the excitation and emission of the phosphor, which means that the LED provided therewith emits a homogeneous light cone of constant colour and has high light output. The ceramic phosphor bodies can be produced on a large industrial scale, for example, as flakes in thicknesses from a few 100 nm to about 500 μm. The flake dimensions (length×width) are dependent on the arrangement. In the case of direct application to the chip, the size of the flake should be selected in accordance with the chip dimensions (from about 100 μm*100 μm to several mm²) with a certain oversize of about 10% to 30% of the chip surface with a suitable chip arrangement (for example flip-chip arrangement) or correspondingly. If the phosphor flake is installed over a finished LED, all of the exiting light cone passes through the flake.

The side surfaces of the ceramic phosphor body can be coated with a light metal or noble metal, preferably aluminium or silver. The metal coating has the effect that light does not exit laterally from the phosphor body. Light exiting laterally can reduce the light current to be coupled out of the LED.

The metal coating of the ceramic phosphor body is carried out in a process step after the isostatic pressing to give rods or flakes, where the rods or flakes can optionally be cut to the requisite size before the metal coating. To this end, the side surfaces are wetted, for example, with a solution comprising silver nitrate and glucose and subsequently exposed to an ammonia atmosphere at elevated temperature. A silver coating, for example, forms on the side surfaces in the process.

Alternatively, currentless metallisation processes are also suitable, see, for example, Hollemann-Wiberg, Lehrbuch der Anorganischen Chemie [Textbook of Inorganic Chemistry], Walter de Gruyter Verlag or Ullmanns Enzyklopädie der chemischen Technologie [Ullmann's Encyclopaedia of Chemical Technology].

The ceramic phosphor body can, if necessary, be fixed to the baseboard of an LED chip using a water-glass solution.

In a further embodiment, the ceramic phosphor body has, on the side opposite an LED chip, a structured (for example pyramidal) surface. This enables as much light as possible to be coupled out of the phosphor body. The structured surface on the phosphor body is produced by carrying out the isostatic pressing using a compression mould having a structured pressure plate and thus embossing a structure into the surface. Structured surfaces are desired if the aim is to produce the thinnest possible phosphor bodies or flakes. The pressing conditions are known to the person skilled in the art (see J. Kriegsmann, Technische keramische Werkstoffe [Industrial Ceramic Materials], Chapter 4, Deutscher Wirtschaftsdienst, 1998). It is important that the pressing temperatures used are ⅔ to ⅚ of the melting point of the substance to be pressed.

The present invention furthermore relates to a process for the production of a shaped body, preferably a phosphor body, having the following process steps:

a) preparation of a samarium-doped compound by mixing at least 4 starting materials selected from lanthanum-, magnesium-, aluminium-, samarium-, gadolinium-, boron-, yttrium-, lutetium-containing materials, b) optionally addition of at least one further organic and/or inorganic substance, c) thermal aftertreatment of the phosphors and formation of a shaped body having a rough surface, d) coating of the surface with nanoparticles comprising $SiO_2$, $TiO_2$, $Al_2O_3$, ZnO, $ZrO_2$ and/or $Y_2O_3$ or mixed oxides thereof or with nanoparticles comprising the compounds according to the invention.

In addition, the phosphors according to the invention can be excited over a broad range, which extends from about 350 nm to 530 nm, preferably 430 nm to about 500 nm. These phosphors are thus suitable not only for excitation by UV- or blue-emitting primary light sources, such as LEDs or conventional discharge lamps (for example based on Hg), but also for light sources such as those which utilise the blue $In^{3+}$ line at 451 nm.

The present invention furthermore relates to a lighting unit having at least one primary light source whose emission maximum or maxima is (are) in the range 250 nm to 530 nm, preferably 350 nm to about 500 nm. A range between 440 and 480 nm is particularly preferred, with the primary radiation being partially or fully converted into longer-wavelength radiation by the compounds or phosphors according to the invention. This lighting unit is preferably white-emitting or emits light having a certain colour point (colour-on-demand principle).

In a preferred embodiment of the lighting unit according to the invention, the light source is a luminescent indium aluminium gallium nitride, in particular of the formula $In_iGa_jAl_kN$, where $0 \le i$, $0 \le j$, $0 \le k$, and $i+j+k=1$.

Possible forms of light sources of this type are known to the person skilled in the art. These can be light-emitting LED chips of various structure.

In a further preferred embodiment of the lighting unit according to the invention, the light source is a luminescent arrangement based on ZnO, TCO (transparent conducting oxide), ZnSe or SiC or also an arrangement based on an organic light-emitting layer (OLED).

In a further preferred embodiment of the lighting unit according to the invention, the light source is a source which exhibits electroluminescence and/or photoluminescence. The light source may furthermore also be a plasma or discharge source.

The phosphors according to the invention can either be dispersed in a resin (for example epoxy or silicone resin) or, given suitable size ratios, arranged directly on the primary light source and/or alternatively arranged remote therefrom, depending on the application (the latter arrangement also encompasses "remote phosphor technology"). The advantages of remote phosphor technology are known to the person skilled in the art and are revealed, for example, by the following publication: Japanese Journ. of Appl. Phys. Vol. 44, No. 21 (2005), L649-L651.

In a further embodiment, it is preferred for the optical coupling of the lighting unit between the phosphor and the primary light source to be achieved by a light-conducting arrangement. It is thus possible for the primary light source to be installed at a central location and to be optically coupled to the phosphor by means of light-conducting devices, such as, for example, optical fibres. In this way, it is possible to achieve lights adapted to the lighting wishes which merely consist of one or various phosphors, which can be arranged to form a light screen, and an optical waveguide, which is coupled to the primary light source. In this way, it is possible to place a strong primary light source at a location which is favourable for electrical installation and to install lights comprising phosphors which are coupled to the optical waveguides at any desired locations without further electrical cabling, but instead only by laying optical waveguides.

The present invention furthermore relates to the use of the shaped bodies according to the invention as phosphor bodies.

The present invention furthermore relates to the use of the compounds according to the invention for the partial or complete conversion of the near-UV emission from a luminescent diode.

Preference is furthermore given to the use of the compounds according to the invention for conversion of the near-UV emission into visible white radiation. Preference is furthermore given to the use of the compounds according to the invention for conversion of the primary radiation into a certain colour point in accordance with the "colour-on-demand" concept.

The compounds of the formula I according to the invention can be employed individually or as a mixture with the following phosphors which are familiar to the person skilled in the art:

$Ba_2SiO_4:Eu^{2+}$, $BaSi_2O_6:Pb^{2+}$, $Ba_xSr_{1-x}F_2:Eu^{2+}$, $BaSrMgSi_2O_7:Eu^{2+}$, $BaTiP_2O_7$, $(Ba,Ti)_2P_2O_7$:Ti, $Ba_3WO_6$:U, $BaY_2F_8$ $Er^{3+}$,$Yb^+$, $Be_2SiO_4:Mn^{2+}$, $Bi_4Ge_3O_{12}$, $CaAl_2O_4$:$Ce^{3+}$, $CaLa_4O_7:Ce^{3+}$, $CaAl_2O_4:Eu^{2+}$, $CaAl_2O_4:Mn^{2+}$, $CaAl_4O_7:Pb^{2+}$, $Mn^{2+}$, $CaAl_2O_4:Tb^{3+}$, $Ca_3Al_2Si_3O_{12}:Ce^{3+}$, $Ca_3Al_2Si_3Oi_2:Ce^{3+}$, $Ca_3Al_2Si_3O_{12}:Eu^{2+}$, $Ca_2B_5O_9Br:Eu^{2+}$, $Ca_2B_6O_6Cl:Eu^{2+}$, $Ca_2B_6O_6Cl:Pb^{2+}$, $CaB_2O_4:Mn^{2+}$, $Ca_2B_2O_6:Mn^{2+}$, $CaB_2O_4:Pb^{2+}$, $CaB_2P_2O_6:Eu^{2+}$, $Ca_6B_2SiO_{10}:Eu^{3+}$, $Ca_{0.5}Ba_{0.5}Al_{12}O_{16}:Ce^{3+}$, $Mn^{2+}$, $Ca_2Ba_3(PO4)_3Cl:Eu^{2+}$, $CaBr_2:Eu^{2+}$ in $SiO_2$, $CaCl_2:Eu^{2+}$ in $SiO_2$, $CaCl_2:Eu^{2+}$, $Mn^{2+}$ in $SiO_2$, $CaF_2:Ce^{3+}$, $CaF_2:Ce^{3+}$, $Mn^{2+}$, $CaF_2:Ce^{3+}$, $Tb^{3+}$, $CaF_2:Eu^{2+}$, $CaF_2:Mn^{2+}$, $CaF_2$:U, $CaGa_2O_4:Mn^{2+}$, $CaGa_4O_7:Mn^{2+}$, $CaGa_2S_4:Ce^{3+}$, $CaGa_2S_4:Eu^{2+}$, $CaGa_2S_4:Mn^{2+}$, $CaGa_2S_4:Pb^{2+}$, $CaGeO_3:Mn^{2+}$, $CaI_2:Eu^{2+}$ in $SiO_2$, $CaI_2:Eu^{2+}$, $Mn^{2+}$ in $SiO_2$, $CaLaBO_4:Eu^{3+}$, $CaLaB_3O_7:Ce^{3+}$, $Mn^{2+}$, $Ca_2La_2BO_{6.4}:Pb^{2+}$, $Ca_2MgSi_2O_7$, $Ca_2MgSi_2O_7:Ce^{3+}$, $CaMgSi_2O_6:Eu^{2+}$, $Ca_3MgSi_2O_8:Eu^{2+}$, $Ca_2MgSi_2O_7:Eu^{2+}$, $CaMgSi_2O_6:Eu^{2+}$, $Mn^{2+}$, $Ca_2MgSi_2O_7:Eu^{2+}$, $Mn^{2+}$, $CaMoO_4$, $CaMoO_4:Eu^{3+}$, $CaO:Bi^{3+}$, $CaO:Cd^{2+}$, $CaO:Cu^+$, $CaO:Eu^{3+}$, $CaO:Eu^{3+}$,$Na^+$, $CaO:Mn^{2+}$, $CaO:Pb^{2+}$, $CaO:Sb^{3+}$, $CaO:Sm^{3+}$, $CaO:Tb^{3+}$, $CaO$:Tl, $CaO:Zn^{2+}$, $Ca_2P_2O_7:Ce^{3+}$, $\alpha$-$Ca_3(PO_4)_2:Ce^{3+}$, $\beta$-$Ca_3(PO_4)_2:Ce^{3+}$, $Ca_6(PO_4)_3Cl:Eu^{2+}$, $Ca_6(PO_4)_3Cl:Mn^{2+}$, $Ca_6(PO_4)_3Cl:Sb^{3+}$, $Ca_6(PO_4)_3Cl:Sn^{2+}$, $\beta$-$Ca_3(PO_4)_2:Eu^{2+}$, $Mn^{2+}$, $Ca_6(PO_4)_3F:Mn^{2+}$, $Ca_5(PO_4)_3F:Sb^{3+}$, $Ca_5(PO_4)_3F:Sn^{2+}$, $\alpha$-$Ca_3(PO_4)_2:Eu^{2+}$, $\beta$-$Ca_3(PO_4)_2:Eu^{2+}$, $Ca_2P_2O_7:Eu^{2+}$, $Ca_2P_2O_7:Eu^{2+}$, $Mn^{2+}$, $CaP_2O_6:Mn^{2+}$, $\alpha$-$Ca_3(PO_4)_2:Pb^{2+}$, $\alpha$-$Ca_3(PO_4)_2:Sn^{2+}$, $\beta$-$Ca_3(PO_4)_2:Sn^{2+}$, $\beta$-$Ca_2P_2O_7:Sn$, Mn, $\alpha$-$Ca_3(PO_4)_2:Tr$, $CaS:Bi^{3+}$, $CaS:Bi^{3+}$, Na, $CaS:Ce^{3+}$, $CaS:Eu^{2+}$, $CaS:Cu^+$, $Na^+$, $CaS:La^{3+}$, $CaS:Mn^{2+}$, $CaSO_4:Bi$, $CaSO_4:Ce^{3+}$, $CaSO_4:Ce^{3+}$, $Mn^{2+}$, $CaSO_4:Eu^{2+}$, $CaSO_4:Eu^{2+}$, $Mn^{2+}$, $CaSO_4:Pb^{2+}$, $CaS:Pb^{2+}$, $CaS:Pb^{2+}$, Cl, $CaS:Pb^{2+}$, $Mn^{2+}$, $CaS:Pr^{3+}$, $Pb^{2+}$, Cl, $CaS:Sb^{3+}$, $CaS:Sb^{3+}$, Na, $CaS:Sm^{3+}$, $CaS:Sn^{2+}$, $CaS:Sn^{2+}$, F, $CaS:Tb^{3+}$, $CaS:Tb^{3+}$, Cl, $CaS:Y^{3+}$, $CaS:Yb^{2+}$, $CaS:Yb^{2+}$, Cl, $CaSiO_3:Ce^{3+}$, $Ca_3SiO_4Cl_2:EU^{2+}$, $Ca_3SiO_4Cl_2:Pb^{2+}$, $CaSiO_3:EU^{2+}$, $CaSiO_3:Mn^{2+}$, Pb, $CaSiO_3:Pb^{2+}$, $CaSiO_3:Pb^{2+}$, $Mn^{2+}$, $CaSiO_3:Ti^{4+}$, $CaSr_2(PO_4)_2:Bi^{3+}$, $\beta$-$(Ca,Sr)_3(PO_4)_2:Sn^{2+}+Mn^{2+}$, $CaTi_{0.6}Al_{0.1}O_3:Bi^{3+}$, $CaTiO_3:Eu^{3+}$, $CaTiO_3Pr^{3+}$, $Ca_5(VO_4)_3Cl$, $CaWO_4$, $CaWO_4:Pb^{2+}$, $CaWO_4$:W, $Ca_3WO_6$:U, $CaYAlO_4:Eu^{3+}$, $CaYBO_4:Bi^{3+}$, $CaYBO_4:Eu^{3+}$, $CaYBO_4:Eu^{3+}$, $CaYB_{0.8}O_{3.7}:Eu^{3+}$, $CaY_2ZrO_6:Eu^{3+}$, $(Ca,Zn,Mg)_3(PO_4)_2$:Sn, $CeF_3$, $(Ce,Mg)BaAl_{11}O_{18}$:Ce, $(Ce,Mg)SrAl_{11}O_{18}$:Ce, $CeMgAl_{11}O_{16}$:Ce:Tb, $Cd_2B_6O_{11}:Mn^{2+}$, $CdS:Ag^+$, Cr, $CdS$:In, $CdS$:In, $CdS$:In, Te, $CdS$:Te, $CdWO_4$, CsF, CsI, CsI:$Na^+$, CsI:Tl, $(ErCl_3)_{0.25}(BaCl_2)_{0.75}$, GaN:Zn, $Gd_3Ga_6O_{12}:Cr^{3+}$, $Gd_3Ga_6O_{12}$:Cr, Ce, $GdNbO_4:Bi^{3+}$, $Gd_2O_2S:Eu^{3+}$, $Gd_2O_2Pr^{3+}$, $Gd_2O_2S$:Pr, Ce, F, $Gd_2O_2S:Tb^{3+}$, $Gd_2SiO_6:Ce^{3+}$, $KAl_{11}O_{17}$:$Tl^+$, $KGa_{11}O_{17}:Mn^{2+}$, $K_2La_2Ti_3O_{10}$:Eu, $KMgF_3:Eu^{2+}$, $KMgF_3:Mn^{2+}$, $K_2SiF_6:Mn^{4+}$, $LaAl_3B_4O_{12}:Eu^{3+}$, $LaAlB_2O_6:Eu^{3+}$, $LaAlO_3:Eu^{3+}$, $LaAlO_3:Sm^{3+}$, $LaAsO_4:Eu^{3+}$, $LaBr_3:Ce^{3+}$, $LaBO_3:Eu^{3+}$, $(La,Ce,Tb)PO_4$:Ce:Tb, $LaCl_3:Ce^{3+}$, $La_2O_3:Bi^{3+}$, $LaOBr:Tb^{3+}$, $LaOBr:Tm^{3+}$, $LaOCl:Bi^{3+}$, $LaOCl:Eu^{3+}$, $LaOF:Eu^{3+}$, $La_2O_3:Eu^{3+}$, $La_2O_3:Pr^{3+}$, $La_2O_2S:Tb^{3+}$, $LaPO_4:Ce^{3+}$, $LaPO_4:Eu^{3+}$, $LaSiO_3Cl:Ce^{3+}$, $LaSiO_3Cl:Ce^{3+}$, $Tb^{3+}$, $LaVO_4:Eu^{3+}$, $La_2W_3O_{12}:Eu^{3+}$, $LiAlF_4:Mn^{2+}$, $LiAl_6O_8:Fe^{3+}$, $LiAlO_2:Fe^{3+}$, $LiAlO_2:Mn^{2+}$, $LiAl_6O_8:Mn^{2+}$, $Li_2CaP_2O_7:Ce^{3+}$, $Mn^{2+}$, $LiCeBa_4Si_4O_{14}:Mn^{2+}$, $LiCeSrBa_3Si_4O_{14}:Mn^{2+}$, $LiInO_2:Eu^{3+}$, $LiInO_2:Sm^{3+}$, $LiLaO_2:Eu^{3+}$, $LuAlO_3:Ce^{3+}$, $(Lu,Gd)_2SiO_6:Ce^{3+}$, $Lu_2SiO_6:Ce^{3+}$, $Lu_2Si_2O_7:Ce^{3+}$, $LuTaO_4:Nb^{5+}$, $Lu_{1-x}Y_xAlO_3:Ce^{3+}$, $MgAl_2O_4:Mn^{2+}$, $MgSrAl_{10}O_{17}$:Ce, $MgB_2O_4:Mn^{2+}$, $MgBa_2(PO_4)_2:Sn^{2+}$, $MgBa_2(PO_4)_2$:U, $MgBaP_2O_7:Eu^{2+}$, $MgBaP_2O_7:Eu^{2+}$, $Mn^{2+}$, $MgBa_3Si_2O_8:Eu^{2+}$, $MgBa(SO_4)_2:Eu^{2+}$, $Mg_3Ca_3(PO_4)_4:Eu^{2+}$, $MgCaP_2O_7:Mn^{2+}$, $Mg_2Ca(SO_4)_3:Eu^{2+}$, $Mg_2Ca(SO_4)_3:Eu^{2+}$, $Mn^2$, $MgCeAl_nO_{19}:Tb^{3+}$, $Mg_4(F)GeO_6:Mn^{2+}$, $Mg_4(F)(Ge,Sn)O_6:Mn^{2+}$, $MgF_2:Mn^{2+}$, $MgGa_2O_4:Mn^{2+}$, $Mg_8Ge_2O_{11}F_2:Mn^{4+}$, $MgS:Eu^{2+}$, $MgSiO_3:Mn^{2+}$, $Mg_2SiO_4:Mn^{2+}$, $Mg_3SiO_3F_4:Ti^{4+}$, $MgSO_4:Eu^{2+}$, $MgSO_4:Pb^{2+}$, $MgSrBa_2Si_2O_7:Eu^{2+}$, $MgSrP_2O_7:Eu^{2+}$, $MgSr_6(PO_4)_4:Sn^{2+}$, $MgSr_3Si_2O_8:Eu^{2+}$, $Mn^{2+}$, $Mg_2Sr(SO_4)_3:Eu^{2+}$, $Mg_2TiO_4:Mn^{4+}$, $MgWO_4$, $MgYBO_4:Eu^{3+}$, $Na_3Ce(PO_4)_2:Tb^{3+}$, NaI:Tl, $Na_{1.23}K_{0.42}Eu_{0.12}TiSi_4O_{11}:Eu^{3+}$, $Na_{1.23}K_{0.42}Eu_{0.12}TiSi_6O_{13}.xH_2O:Eu^{3+}$, $Na_{1.26}K_{0.46}Er_{0.08}TiSi_4O_{11}:Eu^{3+}$, $Na_2Mg_3Al_2Si_2O_{10}:Tb$, $Na(Mg_{2-x}Mn_x)LiSi_4O_{10}F_2:Mn$, $NaYF_4:Er^{3+}$, $Yb^{3+}$, $NaYO_2:Eu^{3+}$, P46 (70%)+P47 (30%), $SrAl_{12}O_{19}:Ce^{3+}$, $Mn^{2+}$, $SrAl_2O_4:Eu^{2+}$, $SrAl_4O_7:Eu^{3+}$, $SrAl_{12}O_{19}:Eu^{2+}$, $SrAl_2S_4:Eu^{2+}$, $Sr_2B_6O_9Cl:Eu^{2+}$, $SrB_4O_7:Eu^{2+}(F,Cl,Br)$, $SrB_4O_7:Pb^{2+}$, $SrB_4O_7:Pb^{2+}$, $Mn^{2+}$, $SrB_8O_{13}:Sm^{2+}$, $Sr_xBa_yCl_zAl_2O_{4-z/2}:Mn^{2+}$, $Ce^{3+}$, $SrBaSiO_4:Eu^{2+}$, $Sr(Cl,Br,I)_2$: $Eu^{2+}$ in $SiO_2$, $SrCl_2:Eu^{2+}$ in $SiO_2$, $Sr_5Cl(PO_4)_3:Eu$, $Sr_wF_xB_4O_{6.6}:Eu^{2+}$, $Sr_wF_xB_yO_z:Eu^{2+}$, $Sm^{2+}$, $SrF_2:Eu^{2+}$, $SrGa_{12}O_{19}:Mn^{2+}$, $SrGa_2S_4:Ce^{3+}$, $SrGa_2S_4:Eu^{2+}$, $SrGa_2S_4:Pb^{2+}$, $SrIn_2O_4:Pr^{3+}$, $Al^{3+}$, $(Sr,Mg)_3(PO_4)_2:Sn$, $SrMgSi_2O_6:Eu^{2+}$, $Sr_2MgSi_2O_7:Eu^{2+}$, $Sr_3MgSi_2O_8:Eu^{2+}$, $SrMoO_4:U$, $SrO.3B_2O_3:Eu^{2+}$, Cl, $\beta\text{-}SrO.3B_2O_3:Pb^{2+}$, $\beta\text{-}SrO.3B_2O_3:Pb^{2+}$, $Mn^{2+}$, $\alpha\text{-}SrO.3B_2O_3:Sm^{2+}$, $Sr_6P_6BO_{20}:Eu$, $Sr_6(PO_4)_3Cl:Eu^{2+}$, $Sr_6(PO_4)_3Cl:Eu^{2+}$, $Pr^{3+}$, $Sr_6(PO_4)_3Cl:Mn^{2+}$, $Sr_6(PO_4)_3Cl:Sb^{3+}$, $Sr_2P_2O_7:Eu^{2+}$, $\beta\text{-}Sr_3(PO_4)_2:Eu^{2+}$, $Sr_6(PO_4)_3F:Mn^{2+}$, $Sr_6(PO_4)_3F:Sb^{3+}$, $Sr_6(PO_4)_3F:Sb^{3+}$, $Mn^{2+}$, $Sr_6(PO_4)_3$ $F:Sn^{2+}$, $Sr_2P_2O_7:Sn^{2+}$, $\beta\text{-}Sr_3(PO_4)_2:Sn^{2+}$, $\beta\text{-}Sr_3(PO_4)_2:Sn^{2+}$, $Mn^{2+}(Al)$, $SrS:Ce^{3+}$, $SrS:Eu^{2+}$, $SrS:Mn^{2+}$, $SrS:Cu^+$, Na, $SrSO_4:Bi$, $SrSO_4:Ce^{3+}$, $SrSO_4:Eu^{2+}$, $SrSO_4:Eu^{2+}$, $Mn^{2+}$, $Sr_6Si_4O_{10}Cl_6:Eu^{2+}$, $Sr_2SiO_4:Eu^{2+}$, $SrTiO_3:Pr^{3+}$, $SrTiO_3:Pr^{3+}$, $Al^{3+}$, $Sr_3WO_6:U$, $SrY_2O_3:Eu^{3+}$, $ThO_2:Eu^{3+}$, $ThO_2:Pr^{3+}$, $ThO_2:Tb^{3+}$, $YAl_3B_4O_{12}:Bi^{3+}$, $YAl_3B_4O_{12}:Ce^{3+}$, $YAl_3B_4O_{12}:Ce^{3+}$, Mn, $YAl_3B_4O_{12}:Ce^{3+}$, $Tb^{3+}$, $YAl_3B_4O_{12}:Eu^{3+}$, $YAl_3B_4O_{12}:Eu^{3+}$, $Cr^{3+}$, $YAl_3B_4O_{12}:Th^{4+}$, $Ce^{3+}$, $Mn^{2+}$, $YAlO_3:Ce^{3+}$, $Y_3Al_6O_{12}:Ce^{3+}$, $Y_3Al_6O_{12}:Cr^{3+}$, $YAlO_3:Eu^{3+}$, $Y_3Al_5O_{12}:Eu^{3+}$, $Y_4Al_2O_9:Eu^{3+}$, $Y_3Al_6O_{12}:Mn^{4+}$, $YAlO_3:Sm^{3+}$, $YAlO_3:Tb^{3+}$, $Y_3Al_6O_{12}:Tb^{3+}$, $YAsO_4:Eu^{3+}$, $YBO_3:Ce^{3+}$, $YBO_3:Eu^{3+}$, $YF_3:Er^{3+}$, $Yb^{3+}$, $YF_3:Mn^{2+}$, $YF_3:Mn^{2+}$, $Th^{4+}$, $YF_3:Tm^{3+}$, $Yb^{3+}$, $(Y,Gd)BO_3:Eu$, $(Y,Gd)BO_3:Tb$, $(Y,Gd)_2O_3:Eu^{3+}$, $Y_{1.34}Gd_{0.60}O_3(Eu,Pr)$, $Y_2O_3:Bi^{3+}$, YOBr: $Eu^{3+}$, $Y_2O_3:Ce$, $Y_2O_3:Er^{3+}$, $Y_2O_3:Eu^{3+}(YOE)$, $Y_2O_3:Ce^{3+}$, $Tb^{3+}$, $YOCl:Ce^{3+}$, $YOCl:Eu^{3+}$, $YOF:Eu^{3+}$, $YOF:Tb^{3+}$, $Y_2O_3:Ho^{3+}$, $Y_2O_2S:Eu^{3+}$, $Y_2O_2S:Pr^{3+}$, $Y_2O_2S:Tb^{3+}$, $Y_2O_3:Tb^{3+}$, $YPO_4:Ce^{3+}$, $YPO_4:Ce^{3+}$, $Tb^{3+}$, $YPO_4:Eu^{3+}$, $YPO_4:Mn^{2+}$, $Th^{4+}$, $YPO_4:V^{5+}$, $Y(P,V)O_4:Eu$, $Y_2SiO_6:Ce^{3+}$, $YTaO_4$, $YTaO_4:Nb^{5+}$, $YVO_4:Dy^{3+}$, $YVO_4:Eu^{3+}$, $ZnAl_2O_4:Mn^{2+}$, $ZnB_2O_4:Mn^{2+}$, $ZnBa_2S_3:Mn^{2+}$, $(Zn,Be)_2SiO_4:Mn^{2+}$, $Zn_{0.4}Cd_{0.6}S:Ag$, $Zn_{0.6}Cd_{0.4}S:Ag$, $(Zn,Cd)S:Ag$, Cl, $(Zn,Cd)S:Cu$, $ZnF_2:Mn^{2+}$, $ZnGa_2O_4$, $ZnGa_2O_4:Mn^{2+}$, $ZnGa_2S_4:Mn^{2+}$, $Zn_2GeO_4:Mn^{2+}$, $(Zn,Mg)F_2:Mn^{2+}$, $ZnMg_2(PO_4)_2:Mn^{2+}$, $(Zn,Mg)_3(PO_4)_2:Mn^{2+}$, $ZnO:Al^{3+}$, $Ga^{3+}$, $ZnO:Bi^{3+}$, $ZnO:Ga^{3+}$, $ZnO:Ga$, $ZnO$—$CdO:Ga$, $ZnO:S$, $ZnO:Se$, $ZnO:Zn$, $ZnS:Ag$, Cu, Cl, $ZnS:Ag$, Ni, $ZnS:Au$, In, $ZnS$—$CdS$ (25-75), $ZnS$—$CdS$ (50-50), $ZnS$—$CdS$ (75-25), $ZnS$—$CdS:Ag$, Br, Ni, $ZnS$—$CdS:Ag^+$, Cl, $ZnS$—$CdS:Cu$, Br, $ZnS$—$CdS:Cu$, I, $ZnS:Cl^-$, $ZnS:Eu^{2+}$, $ZnS:Cu$, $ZnS:Cu^+$, $Al^{3+}$, $ZnS:Cu$, Sn, $ZnS:Eu^{2+}$, $ZnS:Mn^{2+}$, $ZnS:Mn$, Cu, $ZnS:Mn^{2+}$, $Te^{2+}$, $ZnS:P$, $ZnS:Pb^{2+}$, $ZnS:Pb^{2+}$, $Cl^-$, $ZnS:Pb$, Cu, $Zn_3(PO_4)_2:Mn^{2+}$, $Zn_2SiO_4:Mn^{2+}$, $Zn_2SiO_4:Mn^{2+}$, $As^{5+}$, $Zn_2SiO_4:Mn$, $Sb_2O_2$, $Zn_2SiO_4:Mn^{2+}$, P, $Zn_2SiO_4:Ti^{4+}$, $ZnS:Sn^{2+}$, $ZnS:Sn$, Ag, $ZnS:Sn^{2+}$, $Li^+$, $ZnS:Te$, Mn, $ZnS$—$ZnTe:Mn^{2+}$, $ZnSe:Cu^+$, Cl, $ZnWO_4$.

The following examples are intended to illustrate the present invention. However, they should in no way be regarded as limiting. All compounds or components which can be used in the compositions are either known and commercially available or can be synthesised by known methods. The temperatures indicated in the examples are always in ° C. It furthermore goes without saying that, both in the description and also in the examples, the added amounts of the components in the compositions always add up to a total of 100%. Percentage data given should always be regarded in the given connection. However, they usually always relate to the weight of the part-amount or total amount indicated.

EXAMPLES

Example 1

Preparation of $La_{0.99}Sm_{0.01}MgAl_{11}O_{19}$ by the Combustion Method

For the preparation of 10.0 g of the above-mentioned phosphor, 2.1106 g of $La_2O_3$ and 0.0228 g of $Sm_2O_3$ are dissolved in 200 ml of dilute nitric acid (prepared from 10 ml of conc. $HNO_3$ in 200 ml of water), and the excess acid is subsequently removed by evaporation. The residues obtained are dissolved in 500 ml of dist. water, 3.3556 g of $Mg(NO_3)_2$ $6H_2O$ and 54.0036 g of $Al(NO_3)_3$ $9H_2O$ are subsequently added successively heated to 80 to 90° C. 10.30 g of tris(hydroxymethyl) aminomethane (in the molar ratio 1:0.5 to the cations) are then added. A brown powder mixture is obtained. The mixture is heated firstly at 1000 C for 2 hours and subsequently again at about 1500° C. for 8 hours.

Example 2

Preparation of $La_{0.99}Sm_{0.01}Sr_2AlO_5$ by the Solid-State Diffusion Method For the preparation of 4 g of the above-mentioned phosphor, 1.5314 g of $La_2O_3$, 0.0166 g of $Sm_2O_3$, 2.803 g of $SrCO_3$ and 0.4841 g of nano-$Al_2O_3$ are ground in a mortar, and 50 ml of acetone are added. The mixture is subsequently heated at about 1400° C. for 4 hours.

Example 3

Preparation of $Gd_{0.99}Sm_{0.01}Sr_2AlO_5$ by the Solid-State Diffusion Method For the preparation of 4 g of the above-mentioned phosphor, 1.6335 g of $Gd_2O_3$, 0.0159 g of $Sm_2O_3$, 2.6878 g of $SrCO_3$ and 0.4641 g of nano-$Al_2O_3$ are ground in a mortar, and 50 ml of acetone are added. The mixture is subsequently heated at about 1400° C. for 4 hours.

Example 4

Preparation of $La_{0.99}Sm_{0.01}MgB_5O_{10}$ by the Solid-State Diffusion Method For the preparation of 4 g of the above-mentioned phosphor, 1.7095 g of $La_2O_3$, 0.0185 g of $Sm_2O_3$, 0.8937 g of $MgCO_3$ and 3.4409 of $H_3BO_3$ (5% by weight excess) are ground in a mortar, and 50 ml of acetone are added. The mixture is subsequently heated at 1020° C. for 8 hours.

Example 5

Preparation of $Gd_{0.99}Sm_{0.01}Mg\ B_5O_{10}$ by the Solid-State Diffusion Method For the preparation of 4 g of the above-mentioned phosphor, 1.8146 g of $Gd_2O_3$, 0.0176 g of $Sm_2O_3$, 0.8527 g of $MgCO_3$ and 3.2829 g of $H_3BO_3$ (5% by weight excess) are ground in a mortar, and 50 ml of acetone are added. The mixture is subsequently heated at 1020° C. for 8 hours.

DESCRIPTION OF THE FIGURES

The invention will be explained in greater detail below with reference to a number of working examples, in which.

Figure 1:
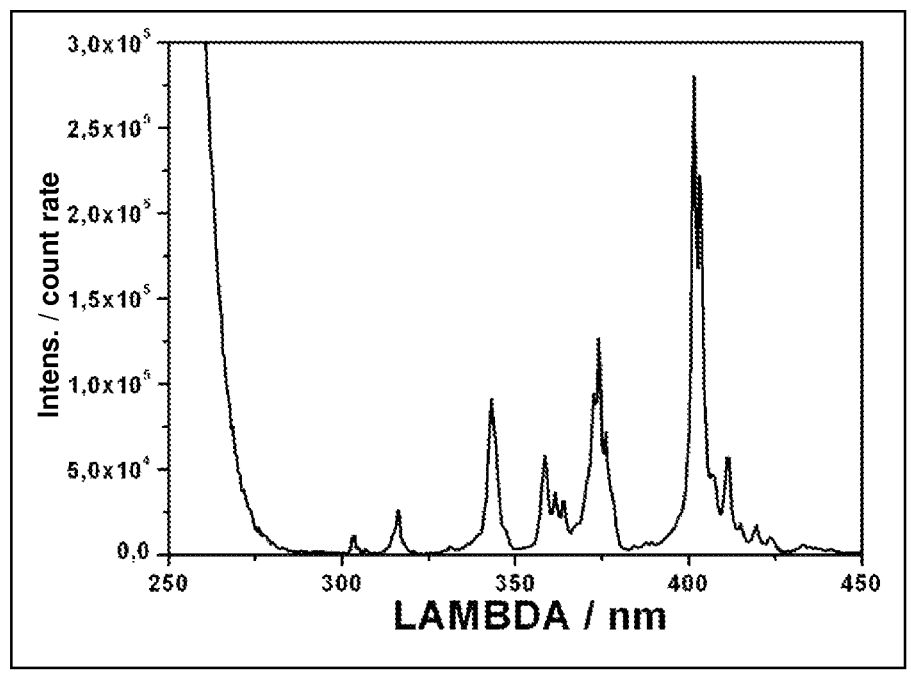
FIG. 1: shows the excitation spectrum of $La_{0.99}Sm_{0.01}MgAl_{11}O_{19}$ ($\lambda_{emission}$=593 nm)
Figure 2:
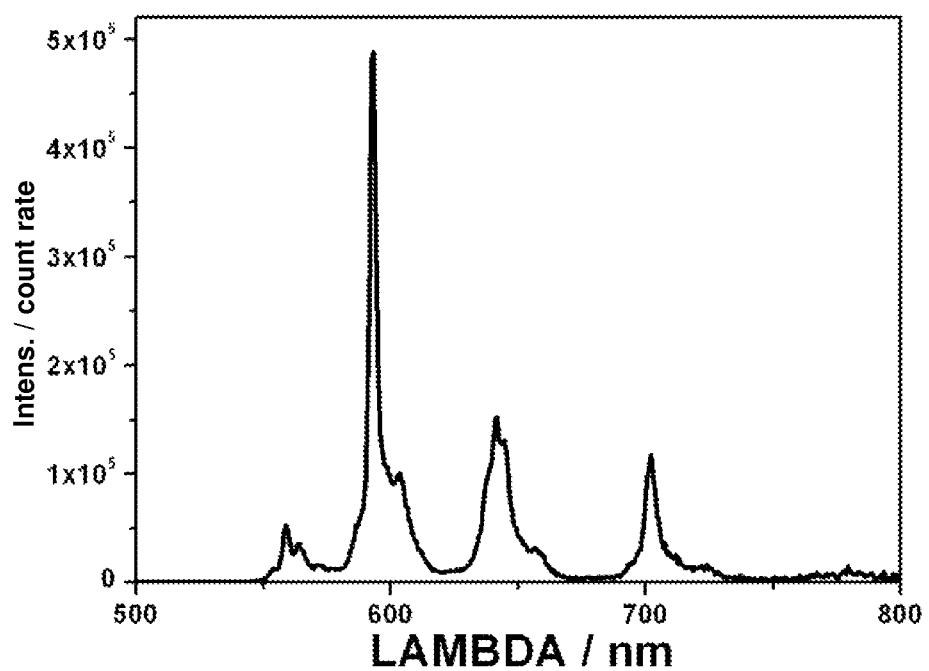
FIG. 2: shows the emission spectrum of $La_{0.99}Sm_{0.01}MgAl_{11}O_{19}$ ($\lambda_{excitation}$=401 nm)
Figure 3:
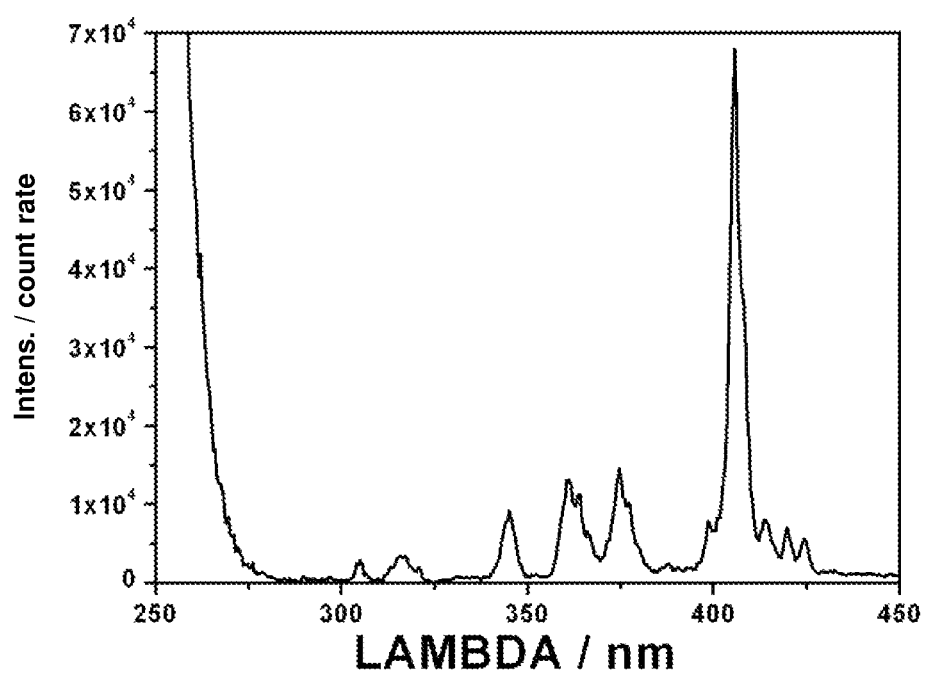
FIG. 3: shows the excitation spectrum of $La_{0.99}Sm_{0.01}Sr_2AlO_5$ ($\lambda_{emission}$=602 nm)
Figure 4:
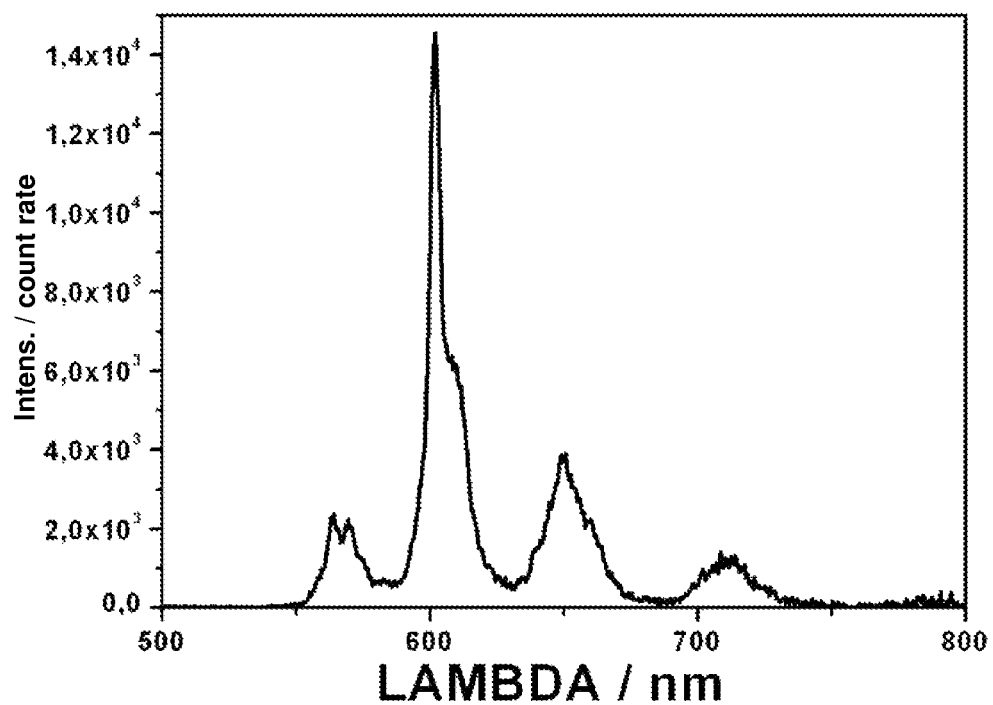
FIG. 4: shows the emission spectrum of $La_{0.99}Sm_{0.01}Sr_2AlO_5$ ($\lambda_{excitation}$=405 nm)
Figure 5:
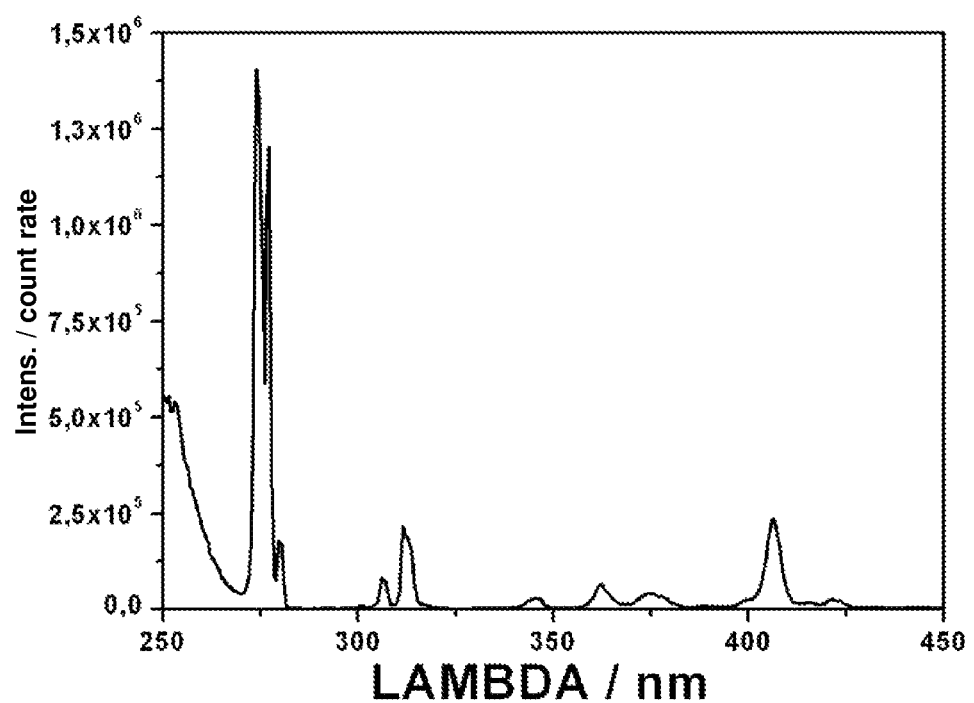
FIG. 5: shows the excitation spectrum of $Gd_{0.99}Sm_{0.01}Sr_2AlO_5$ ($\lambda_{emission}$=602 nm)
Figure 6:
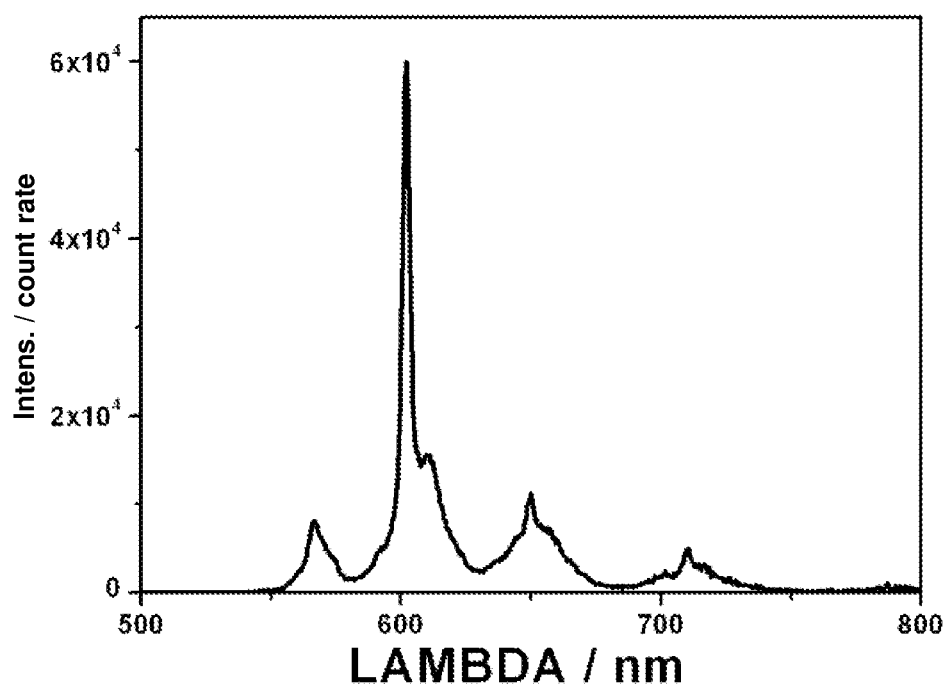
FIG. 6: shows the emission spectrum of $Gd_{0.99}Sm_{0.01}Sr_2AlO_5$ ($\lambda_{excitation}$=406 nm)
Figure 7:
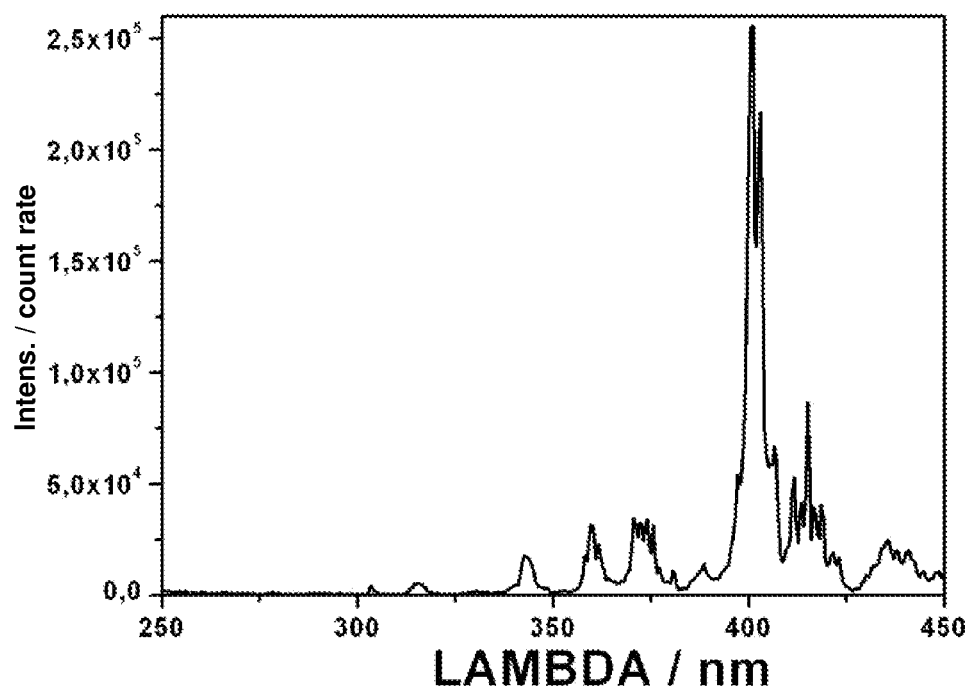
FIG. 7: shows the excitation spectrum of $La_{0.99}Sm_{0.01}MgB_5O_{10}$ ($\lambda_{emission}$=595 nm)
Figure 8:
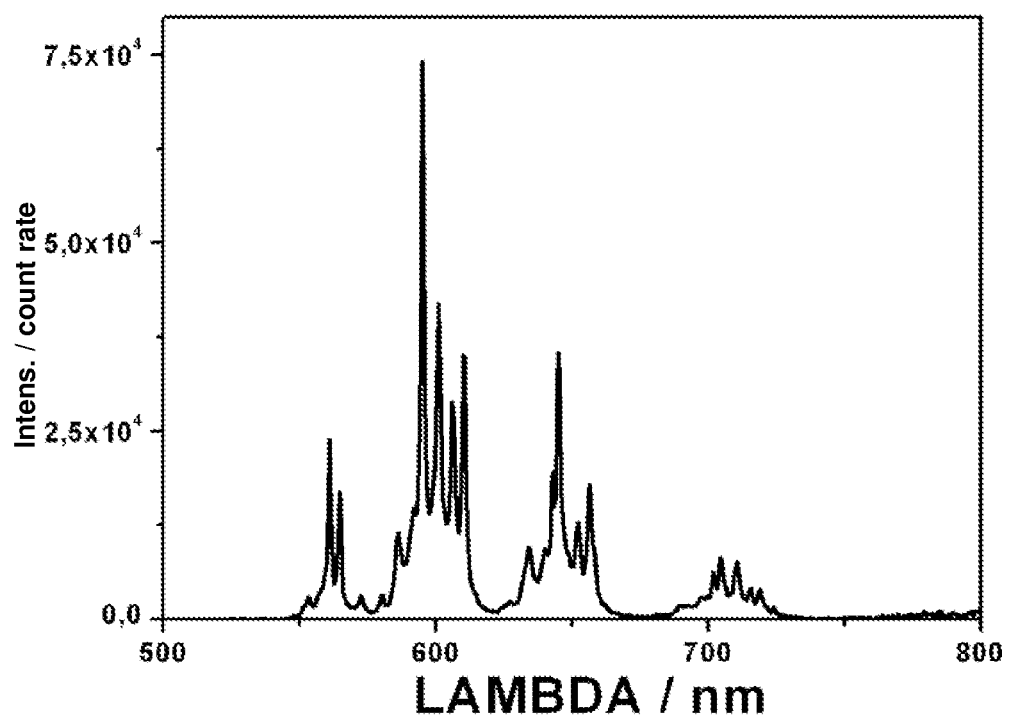
FIG. 8: shows the emission spectrum of $La_{0.99}Sm_{0.01}MgB_5O_{10}$ ($\lambda_{excitation}$=401 nm)
Figure 9:
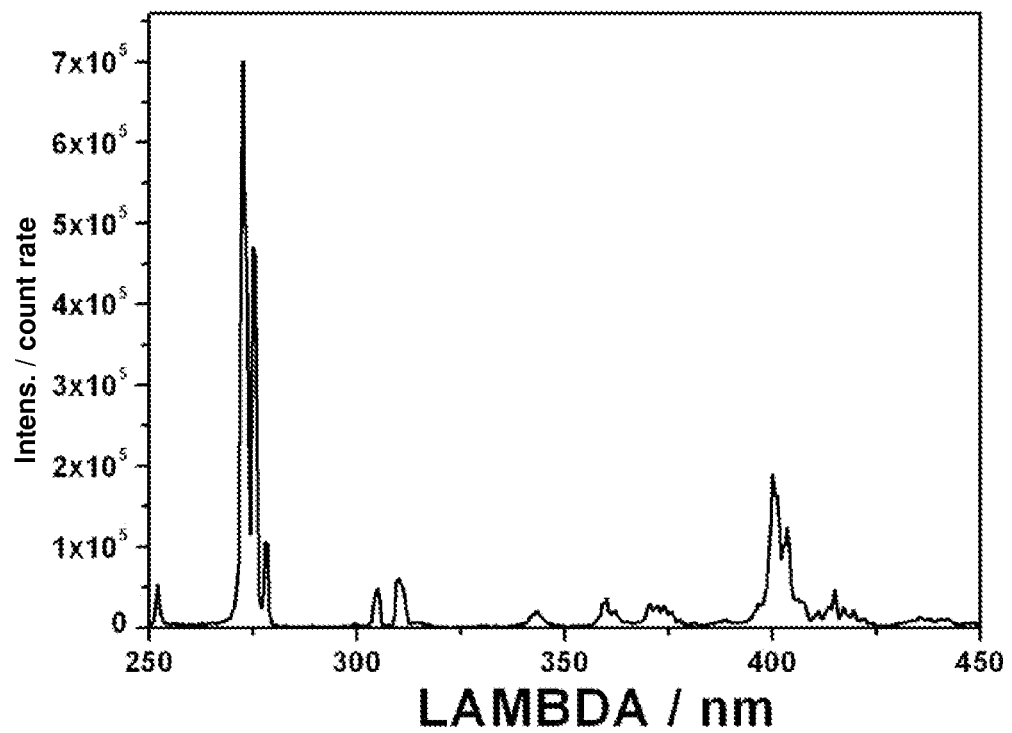
FIG. 9: shows the excitation spectrum of $Gd_{0.99}Sm_{0.01}MgB_5O_{10}$ ($\lambda_{emission}$=595 nm)
Figure 10:
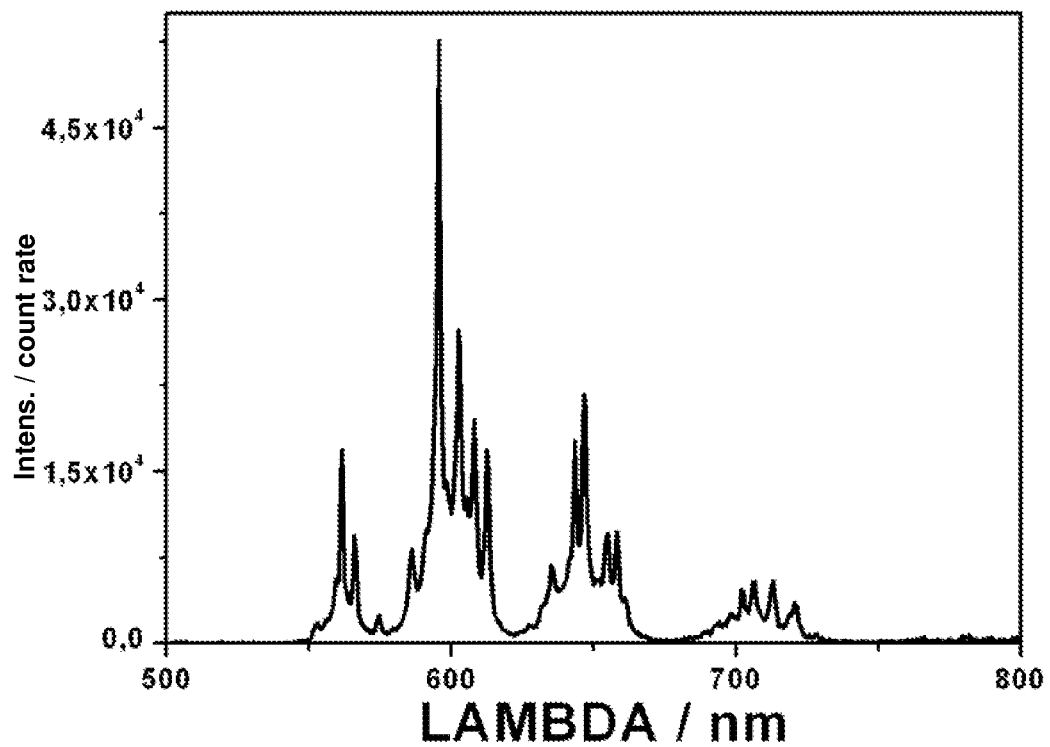
FIG. 10: shows the emission spectrum of $Gd_{0.99}Sm_{0.01}MgB_5O_{10}$ ($\lambda_{excitation}$=401 nm)

The invention claimed is:

1. A phosphor of formula I $$(Ln_{1-a-b}Gd_aSm_b)_wMg_xSr_y(Al_{1-c}B_c)_zO_{(3/2w+x+y+3/2z)} \quad (I)$$

where
Ln=Y, La or Lu or a combination thereof
a, c=0.0 to 1.0
0<b<0.2; and a+b≤1.0
w=1.0 to 3.0
x=1.0 to 2.0 and y=0 or 1.0 to 2.0 or
x=0 or 1.0 to 2.0 and y=1.0 to 2.0
and
z=1 to 5.

2. A phosphor according to claim 1, which is selected from the group consisting of $$LaSr_2AlO_5:Sm \quad (III)$$

$$GdSr_2AlO_5:Sm \quad (IV)$$

$$LaMgB_5O_{10}:Sm \quad (V) \text{ and}$$

$$GdMgB_5O_{10}:Sm \quad (VI).$$

3. A process for preparing a phosphor according to claim 1, comprising
a) preparing a samarium-doped compound by mixing at least 4 starting materials selected from the group consisting of lanthanum-containing materials, magnesium-containing materials, aluminium-containing materials, samarium-containing materials, gadolinium-containing materials, boron-containing materials, yttrium-containing materials and lutetium-containing materials,
b) optionally adding at least one further organic or inorganic substance, and
c) thermally aftertreating the resultant phosphor.

4. A shaped body comprising a phosphor according to claim 1, which has a rough surface
containing nanoparticles comprising $SiO_2$, $TiO_2$, $Al_2O_3$, ZnO, $ZrO_2$ or $Y_2O_3$ or a combination thereof or a mixed oxide thereof,
or
containing particles comprising a phosphor according to claim 1,
or
containing particles comprising a phosphor of formula (I')

$$(Ln_{1-a}Gd_a)_wMg_xSr_y(Al_{1-c}B_c)_zO_{(3/2w+x+y+3/2z)} \quad (I')$$

where
Ln=Y, La or Lu or a combination thereof
a, c=0.0 to 1.0
w=1.0 to 3.0
x=1.0 to 2.0 and y=0 or 1.0 to 2.0 or
x=0 or 1.0 to 2.0 and y=1.0 to 2.0
and
z=1 to 5,
or
containing a combination thereof.

5. A shaped body comprising a phosphor according to claim 1, which has a continuous surface coating
consisting of $SiO_2$, $TiO_2$, $Al_2O_3$, ZnO, $ZrO_2$ or $Y_2O_3$ or a combination thereof or a mixed oxide thereof,
or
consisting of a phosphor of formula (I')

$$(Ln_{1-a}Gd_a)_wMg_xSr_y(Al_{1-c}B_c)_zO_{(3/2w+x+y+3/2z)} \quad (I')$$

where
Ln=Y, La or Lu or a combination thereof
a, c=0.0 to 1.0
w=1.0 to 3.0
x=1.0 to 2.0 and y=0 or 1.0 to 2.0 or
x=0 or 1.0 to 2.0 and y=1.0 to 2.0
and
z=1 to 5,
or
consisting of a combination thereof.

6. A shaped body comprising a compound according to claim 1, which has a porous surface coating
consisting of $SiO_2$, $TiO_2$, $Al_2O_3$, ZnO, $ZrO_2$ or $Y_2O_3$ or a combination thereof or a mixed oxide thereof,
or
consisting of a phosphor according to claim 1,
or
consisting of a phosphor of formula (I')

$$(Ln_{1-a}Gd_a)_wMg_xSr_y(Al_{1-c}B_c)_zO_{(3/2w+x+y+3/2z)} \quad (I')$$

where
Ln=Y, La or Lu or a combination thereof
a, c=0.0 to 1.0
w=1.0 to 3.0
x=1.0 to 2.0 and y=0 or 1.0 to 2.0 or
x=0 or 1.0 to 2.0 and y=1.0 to 2.0
and
z=1 to 5,
or
consisting of a combination thereof.

7. A shaped body comprising a phosphor according to claim 1, which has a surface that carries functional groups which facilitate chemical bonding or physical binding to the environment.

8. A process for preparing a shaped body according to claim 4, comprising
a) preparing a samarium-doped compound by mixing at least 4 starting materials selected from the group consisting of lanthanum-containing materials, magnesium-containing materials, aluminium-containing materials, samarium-containing materials, gadolinium-containing materials, boron-containing materials, yttrium-containing materials and lutetium-containing materials,
b) optionally adding at least one further organic or inorganic substance or a combination thereof, c) thermally aftertreating the resultant phosphor and forming a shaped body having a rough surface, d) coating the surface with nanoparticles comprising $SiO_2$, $TiO_2$, $Al_2O_3$, ZnO, $ZrO_2$ or $Y_2O_3$ or a combination thereof or a mixed oxide thereof, or with nanoparticles comprising a phosphor according to claim 1, or with nanoparticles comprising a phosphor of formula (I')

$$(Ln_{1-a}Gd_a)_w Mg_x Sr_y (Al_{1-c}B_c)_z O_{3/2w+x+y+3/2z} \quad (I')$$

where

Ln=Y, La or Lu or a combination thereof a, c=0.0 to 1.0 w=1.0 to 3.0 x=1.0 to 2.0 and y=0 or 1.0 to 2.0 or x=0 or 1.0 to 2.0 and y=1.0 to 2.0 and z=1 to 5 or with nanoparticles comprising a combination thereof.

9. A lighting unit having at least one primary light source whose emission maximum is in the range of 250 nm to 530 nm, which radiation is partially or fully converted into longer-wavelength radiation by a phosphor according to claim 1.

10. A lighting unit according to claim 9, wherein the light source is a luminescent indium aluminium gallium nitride.

11. A lighting unit according to claim 9, wherein the light source is a luminescent compound based on ZnO, TCO (transparent conducting oxide), ZnSe or SiC.

12. A lighting unit according to claim 9, wherein the light source is a material based on an organic light-emitting layer.

13. A lighting unit according to claim 9, wherein the light source is a plasma or discharge lamp.

14. A lighting unit according to claim 9, wherein the phosphor is arranged directly on the primary light source or remote therefrom, or arranged both directly on the primary light source and remote therefrom.

15. A lighting unit according to claim 9, wherein optical coupling between the phosphor and the primary light source is achieved by a light-conducting arrangement.

16. A method for the partial or complete conversion of near-UV emission from a luminescent diode, comprising converting said emission by a phosphor according to claim 1.

17. A phosphor of formula I $$(Ln_{1-a-b}Gd_a Sm_b)_w Mg_x Sr_y (Al_{1-c}B_c)_z O_{(3/2w+x+y+3/2z)} \quad (I)$$

where

Ln=Y or Lu or a combination thereof, a, c=0.0 to 1.0

0<b<0.2; and a+b≤1.0 w=1.0 to 3.0 x=1.0 to 2.0 and y=0 or 1.0 to 2.0 or x=0 or 1.0 to 2.0 and y=1.0 to 2.0 and z>0.0 to 12.0.

18. A lighting unit having at least one primary light source whose emission maximum is in the range of 250 nm to 530 nm, which radiation is partially or fully converted into longer-wavelength radiation by a phosphor according to claim 17.

19. A phosphor of formula I $$(Ln_{1-a-b}Gd_a Sm_b)_w Mg_x Sr_y (Al_{1-c}B_c)_z O_{(3/2w+x+y+3/2z)} \quad (I)$$

where

Ln=Y, La or Lu or a combination thereof, a, c=0.0 to 1.0

0<b<0.2; and a+b≤1.0 w=1.0 to 3.0 x=0 y=1.0 to 2.0 and z>0.0 to 12.0.

20. A lighting unit having at least one primary light source whose emission maximum is in the range of 250 nm to 530 nm, which radiation is partially or fully converted into longer-wavelength radiation by a phosphor according to claim 19.

\* \* \* \* \*